May 8, 1951   S. A. PAOLI   2,552,450
SHRIMP CLEANING IMPLEMENT
Filed June 2, 1949
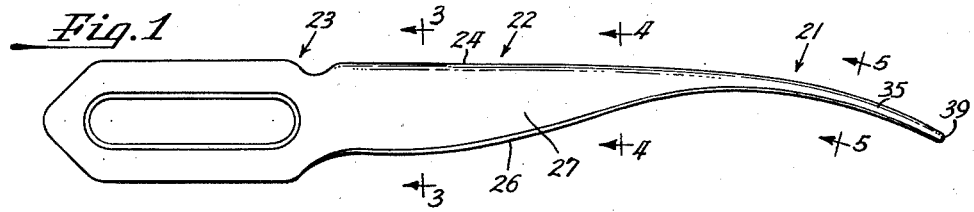
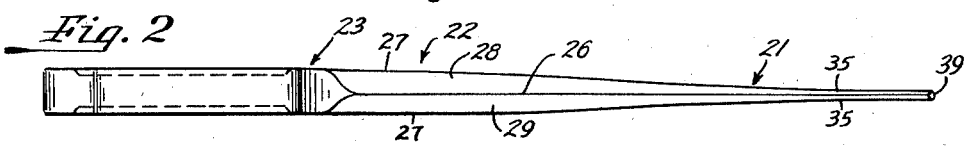
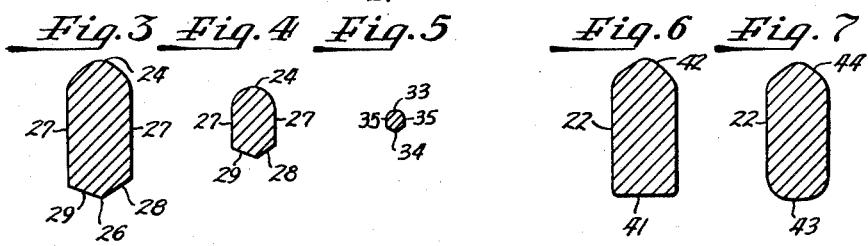
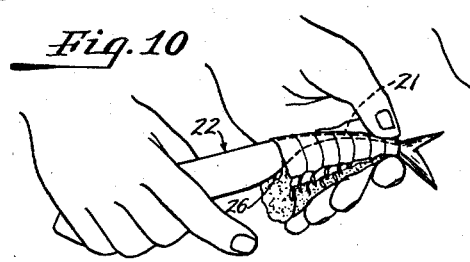 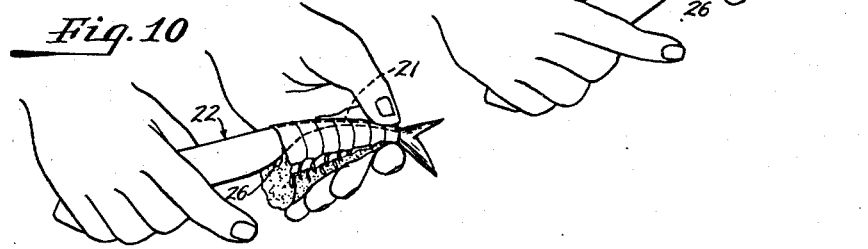
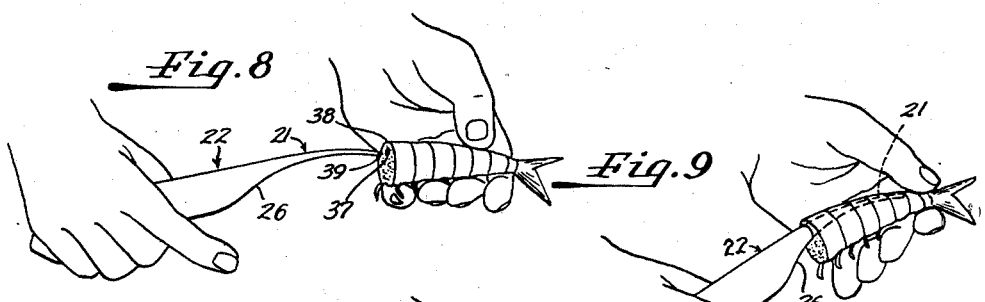
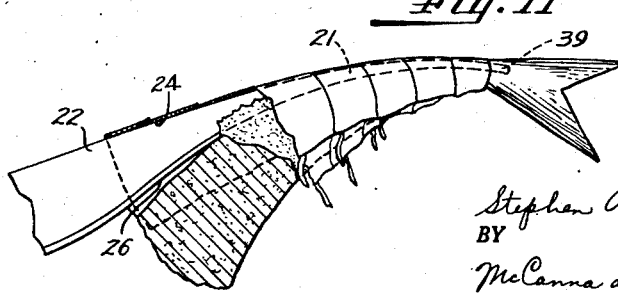
INVENTOR.
Stephen Arthur Paoli
BY
McCanna and Morsbach
ATTYS.

Patented May 8, 1951

2,552,450

UNITED STATES PATENT OFFICE 2,552,450

SHRIMP CLEANING IMPLEMENT

Stephen Arthur Paoli, Rockford, Ill.

Application June 2, 1949, Serial No. 96,699

13 Claims. (Cl. 17—7)

This invention relates to an implement for cleaning shrimp.

At the present time, in the marketing of shrimp, the usual practice is to dehead the shrimp shortly after they are caught and then to sell the deheaded shrimp, the outer hard shell encasing the edible body of the shrimp. The above practice is generally followed whether the shrimp is fresh, canned, or sold as a frozen food. As a consequence the purchaser of a deheaded shrimp must remove the outer shell from the edible body portion of the shrimp and remove the sand vein from the body of the shrimp before the shrimp can be eaten. In general the outer shell or jacket is removed or peeled off the body of the shrimp by means of a knife or the like. After the shell is removed from the body the vein may be cut out of the body. This method of cleaning shrimp is a tedious, boring, and time consuming task.

An object of this invention is to provide a novel implement for quickly and easily cleaning shrimp.

Another object of the invention is the provision of a novel implement having means for de-veining a shrimp.

Another object of the invention is the provision of a novel shrimp cleaner that is positive in its action, that is rugged, and that is relatively inexpensive to produce.

Another object of the invention is to provide a shrimp cleaner having novel means for wedging the edible portion of the shrimp from the shell by simple manipulations.

Another object of the invention is the provision of a shrimp cleaner having novel means for guiding the cleaner in predetermined relation to the shrimp to effect the wedging of the edible portion of the shrimp from the shell.

Other objects and advantages of the invention will become apparent from the following detailed description taken in connection with the accompanying drawings, in which:

Figure 1 is a side elevation of a shrimp cleaner embodying the present invention;

Fig. 2 is a bottom view of the shrimp cleaner shown in Figure 1;

Figs. 3, 4 and 5 are sectional views taken substantially along the lines 3—3, 4—4 and 5—5 of Figure 1;

Figs. 6 and 7 show alternative cross sectional configurations of the shrimp cleaner at positions corresponding to the cross section shown in Fig. 3;

Fig. 8 shows the relative position of a shrimp and a shrimp cleaner prior to engagement of the cleaner with the shrimp;

Fig. 9 shows the prong portion of the shrimp cleaner inserted into the sand vein of a shrimp;

Fig. 10 shows the wedge portion of the shrimp cleaner being thrust forwardly into the head end of the shrimp to wedge the body out of the shell, and Fig. 11 is an enlarged view of a shrimp with a portion of the shell removed to show the relative position of the wedging portion and the body as the cleaner is thrust into the shrimp.

In the embodiment as shown, the implement includes a prong portion 21, a wedging or camming portion 22, and a handle 23. As shown the handle 23 forms the rear end of the implement, the prong portion 21 forms the forward end, and the wedging portion 22 forms the central portion between the handle portion and the prong portion. The handle portion may be of any suitable shape that can be conveniently held. In this instance the handle has a general elongated rectangular cross section.

The wedging portion 22 is rigid with the handle 23 and projects forwardly thereof. The wedging portion includes a top 24, a bottom 26, and side surfaces 27. The side surfaces 27 of the wedging portion are spaced relatively far apart at the base of the wedging portion and converge at the forward end of the wedging portion to define the sides of the base of the prong portion. The top surface 24 of the wedging portion as seen in elevation is substantially straight as shown in Figure 1. The bottom surface 26 as seen in elevation is spaced relatively far apart from the top surface 24 at a position adjacent the handle and then is inclined toward the top surface and at a position adjacent the forward end of the wedging portion 22 the bottom surface 26 defines the bottom of the base of the prong portion 21. The sides 27 are relatively far apart so that the inclined bottom surface 26 in effect defines a relatively wide cam surface on the bottom of the implement. The base of the wedging portion has a cross section that is best illustrated in Fig. 3. The cross sectional shape of the top 24 of the wedging portion is preferably arcuate shaped as shown in Fig. 3 and the bottom may be formed with two plane surfaces 28 and 29 inclined at an angle with respect to the sides 27 to form a generally V-shaped bottom, the point of the V extending downwardly from the body of the implement and disposed at one side of the longitudinal axis of the implement. At its forward end, the wedging portion has a cross section that is best shown in Fig. 4. A comparison of the cross section of Fig. 4 with that of Fig. 3 shows that the sides of the wedging portion 22 are spaced less far apart and the overall distance between the top and the bottom surfaces of the wedging portion is considerably less than in Fig. 3; otherwise these cross sections have the same general configuration.

The prong portion 21 in this instance has a generally arcuate shape and extends forwardly of the wedging portion 22. In general the prong tapers from its base to its extreme forward end as shown in Figure 1. The sides 35 of the prong portion may converge toward the extreme end of the prong portion so that in effect the prong portion tapers when seen in a plan view or the sides may be substantially straight as shown in Fig. 2. The cross sectional shape of an intermediate portion of the prong is best shown in Fig. 5 in which both the top and bottom surfaces 33 and 34 have an arcuate shape. The cross sectional shape of the prong portion may assume many configurations but should be such that the prong portion may be readily inserted in the sand vein 37 to effect rupture of the side wall 38 of the passageway, at the back of the body of the shrimp, containing the sand vein 37. The length of the prong portion may vary considerably. In general, however, the prong portion 21 should be of sufficient length so that the prong portion can be inserted lengthwise of the vein to effect rupture of the side wall 38 and serve as a guide to bring the wedging portion 22 to act between the shell and the body of the shrimp to wedge the body from the shell. Preferably the point 37 of the prong portion 21 is rounded or made blunt.

The handle 23, the wedging portion 22, and the prong portion 21 may be cast as a single unit or they may be formed as separate parts, assembled together. Preferably the top, bottom and side surfaces of the respective portions blend together to provide an implement having relatively smooth surfaces on the prong and wedge portions. Any suitable material such as metals and synthetic resins may be used in the casting or molding of the shrimp cleaner. It is to be understood that other forms of the invention may also be made. For example, sheet metal, wire, metallic ribbon, or other materials may be deformed to have the general exterior configuration of the cleaner such as shown in Figure 1. Also the shrimp cleaner may be formed of wood. This implement may also be used in a machine in which the movements of the operator's hands are simulated by mechanical movements.

In Figs. 6 and 7 there is shown alternative forms of the cross sectional shape of the wedging portion 22. In Fig. 6 the bottom surface 41 is generally flat when viewed in cross section and the top surface 42 has substantially the same configuration as shown in Fig. 3. In Fig. 7 the bottom surface 43 is generally downwardly convex when viewed in cross section while the top 44 has the same configuration as shown in Fig. 3. In all other respects the embodiments shown in Figs. 6 and 7 are the same as the embodiment shown in Figure 1.

In general, the manner in which the shrimp cleaner is utilized in cleaning a shrimp is shown in Figs. 8, 9, 10 and 11. The shrimp is normally arcuate in shape. The operator grasps the shrimp in his left hand with the bottom of the shrimp facing outwardly. Simultaneously the operator straightens the body of the shrimp. The operator thereafter grasps the shrimp cleaner in his right hand and brings the point 39 of the prong portion 21 into position as shown in Fig. 8 so that the point 39 of the prong portion 21 is in alinement with the sand vein 37 of the shrimp. In Fig. 9 the hands of the operator have been moved closer together so that the shrimp cleaner and shrimp have been moved relative to each other. When this relative movement takes place, the prong portion 21 is inserted into the vein 37 and is moved lengthwise of the body of the shrimp. The curvature of the prong tends to facilitate the entrance and passage of the prong lengthwise of the sand vein, particularly where the body of the shrimp is not completely straightened. As more relative movement between the shrimp and the implement takes place the wedge portion 22 is forced into the open end of the sand vein (see Fig. 10). When this occurs the back or side wall 38 of the body of the shrimp adjacent the sand vein 37 is ruptured so that the top surface 24 of the implement is against the back of the shell of the shrimp. During this movement the wedge or cam surface 26 forces the forward end of the body outwardly of the shell from between the sides as shown in Fig. 10. Upon continued relative movement of the implement and the shrimp the cam surface 26 moves farther axially of the body of the shrimp and effects the complete removal of the body of the shrimp from the shell. As the body of the shrimp is being forcibly ejected from the shell by the cam surface 26 the transverse inclination of the surface 29 causes one side of the body to be separated from the shell before the other. This is advantageous in that one side of the body of the shrimp thus tends to move out into the operator's hand in a position whereby the operator can insert his fingers between the body and the shell and grasp the body. Then by simply peeling the body from the remainder of the shrimp, the body comes out in one piece leaving the legs and interconnecting skin covering the bottom attached to the opposite side of the shell (see Fig. 11). In some instances the sand vein will be telescoped onto the prong portion 21. The vein may be readily removed from the prong portion after the body of the shrimp is removed from the shell. In other instances the sand vein may be ruptured when the side wall 38 of the body of the shrimp defining the passageway for receiving the sand vein is ruptured as described above. In the latter case, access to the vein may be had through the ruptured part of the body so that it can be readily removed from the body of the shrimp when the shrimp are being washed.

This construction is extremely simple and permits of an effective method of removing the bodies of shrimp from their shells. Through its use shrimp can be cleaned in a fraction of the time heretofore required in cleaning shrimp by means of paring knives or the like. This shrimp cleaner is extremely advantageous to restaurant owners and the like who clean large quantities of shrimp daily, because of the time and money that may be saved in cleaning shrimp. Also it saves housewives much time and takes the boredom out of cleaning shrimp.

I claim:

1. A device for cleaning shrimp, comprising a body having a prong portion shaped to pass lengthwise through the body of the shrimp to rupture the side walls of the body of the shrimp defining the passageway containing the sand vein to effect removal of the latter and a wedge portion shaped to act between the shell and the body of the shrimp upon relative movement of said body lengthwise of the body of the shrimp to effect the removal of the body of the shrimp from the shell by wedging action.

2. A device for removing the body from the shell of a shrimp upon relative movement between the device and the shrimp, comprising a wedge shaped to act between the shell and the body of the shrimp to force the body from the shell, and means on said wedge for guiding said wedge between the shell and the body of the shrimp.

3. An implement for cleaning shrimp, comprising a body having a top, a bottom, and sides, at one end of said body said top and bottom and said sides respectively being spaced relatively far apart to define a handle, at the opposite end of said body said top and bottom and said sides respectively being spaced relatively close together, and from a position spaced from the handle end of the body said top and bottom converging progressively toward said opposite end of the body to define a generally tapering prong portion, and at a central portion said sides being spaced relatively far apart at a position adjacent the handle and converging progressively toward the prong portion, said top and bottom being spaced relatively far apart at a position adjacent the handle and being closely spaced at a position adjacent said prong portion to define a relatively wide inclined cam surface on the bottom of the body, said cam surface having a portion inclined at an angle to the sides of the body.

4. A shrimp cleaner, comprising a handle, a central portion projecting outwardly from the handle and a prong portion projecting outwardly from the central portion, said central portion having a top, bottom and side surfaces, said bottom surface being relatively wide and spaced relatively far apart from said top surface at a position adjacent the handle and inclining progressively toward the top surface to a position adjacent the prong portion to define a relatively wide cam surface on the bottom of said central portion, said cam surface having a portion inclined relative to the sides of said central portion.

5. An implement for removing the body of a shrimp from the shell of a decapitated shrimp, comprising a wedging portion shaped to act between the shell and the body of the shrimp to force the body from the shell by a wedging action as the implement and the shrimp move relative to each other, an elongated curved prong portion extending outwardly from said wedging portion and shaped to be inserted in the sand vein of the shrimp to guide the wedging portion to effect the above described wedging action, and a handle rigid with the opposite end of the wedging portion for supporting the latter and for holding the implement in a position in which the prong portion is insertable in the vein.

6. A shrimp cleaner, comprising a support, an elongated prong portion spaced from the support and extending forwardly thereof and a generally wedge shaped portion disposed between the prong portion and the support.

7. An implement for cleaning shrimp, comprising a handle, a central portion extending forwardly of one end of the handle and defined by sides, a top and bottom, and a tapering prong portion extending forwardly of the central portion, said sides being in closely spaced relation at a position adjacent the prong portion and flaring outwardly to be spaced relatively far apart at a position adjacent the handle and the spacing between the top and bottom increasing progressively from a position adjacent the prong portion to a position adjacent the handle to form an inclined relatively wide surface between the prong portion and the handle.

8. An implement for removing the body from a shell of a shrimp, comprising a wedging portion shaped to act between the shell and the body of the shrimp to force the body from the shell by a wedging action as the cleaner and shrimp move relative to each other, an elongated arcuate prong portion on one end of said wedging portion shaped to be insertable in the sand vein of the shrimp to guide the wedging portion to effect the above described wedging action and to rupture the body to effect removal of the sand vein, and a handle rigid with the opposite end of the wedging portion for supporting the latter and the prong portion and holding the cleaner in a position in which the prong portion is insertable in the vein.

9. A shrimp cleaner, comprising a body having a handle at one end, a wedging portion rigidly connected to said handle to extend forwardly thereof, said wedging portion having a tapering top, a bottom and sides, said sides converging from a position adjacent the handle to a position adjacent the opposite end of the wedging portion, and the bottom surface of said wedging portion inclined toward the top of the wedging portion from a position adjacent the handle to define a relatively wide cam surface on the bottom extending from a position adjacent the handle to a position spaced from said handle, and an arcuate prong portion integral with and extending forwardly of said wedging portion, said prong portion having a top and a blunt point, said top of the wedging portion and said top of the prong portion having a generally arcuate shaped cross section.

10. A shrimp cleaner, comprising a handle, a wedging portion projecting forwardly of the handle, and an elongated prong portion projecting forwardly of the wedging portion, said wedging portion having a top and bottom surface, said bottom surface being relatively wide and spaced relatively far apart from said top surface at a position adjacent the handle and inclining progressively toward the top to a position adjacent the prong portion to define a relatively wide cam surface on the bottom of said wedging portion.

11. A shrimp cleaner, comprising a body having a top surface, a bottom surface, a handle at one end, a wedging portion adjacent the handle and forwardly thereof, and a generally elongated generally curved prong portion projecting forwardly of the wedging portion, said bottom surface on the wedging portion being spaced relatively far apart from said top surface at a position adjacent the handle and inclining progressively toward the top surface to a position adjacent the prong portion to define a cam surface on the bottom of the wedging portion, said prong portion tapering progressively from its point of connection with the wedging portion to its extreme outer end.

12. An implement for removing the body of a shrimp from the shell of a decapitated shrimp, comprising an elongated prong portion shaped to be inserted in the sand vein of the shrimp, a wedge portion having a base, a forward end, and a top and a bottom surface, said forward end being rigid with said prong portion, said bottom surface being shaped to define an inclined cam surface extending from the forward end to the base, said top and bottom surfaces having their extreme side edges in a relatively closely spaced relation at the forward end and flaring outwardly from the longitudinal axis of the wedge portion to be spaced relatively far apart at the base and a handle rigid with the base of said wedge portion for holding said implement whereby when said implement is moved relative to a shrimp the prong portion follows the vein and guides the wedge portion to act between the shell and the body of the shrimp to cam the latter from the shell.

13. A shrimp cleaner for removing the body of a shrimp from the shell of a decapitated shrimp, comprising a handle, a central portion projecting forwardly from the handle and a prong portion projecting forwardly from the central portion and shaped to be inserted in the sand vein of the shrimp, said central portion having a top and bottom surface, said prong portion shaped to substantially rupture the side wall of the body of the shrimp between the sand vein and the back of the shell to have said top surface engage the back of the shell when the cleaner is moved relative to the shrimp, said bottom surface being relatively wide and spaced relatively far apart from said top surface at a position adjacent the handle and inclined toward the top surface to define a relatively wide inclined cam surface shaped to urge the body of the shrimp from the shell when the top surface engages the back of the shell and the cleaner is moved relative to a shrimp.

STEPHEN ARTHUR PAOLI.

REFERENCES CITED

The following references are of record in the file of this patent:

UNITED STATES PATENTS

| Number | Name | Date |
|---|---|---|
| 2,080,263 | Gibson | May 11, 1937 |
| 2,263,694 | Grayson | Nov. 25, 1941 |
| 2,263,695 | Grayson | Nov. 25, 1941 |
| 2,364,250 | Stokes | Dec. 5, 1944 |